(12) United States Patent
Lebizay et al.

(10) Patent No.: US 7,573,876 B2
(45) Date of Patent: Aug. 11, 2009

(54) INTERCONNECTING NETWORK PROCESSORS WITH HETEROGENEOUS FABRICS

(75) Inventors: Gerald Lebizay, Madison, NJ (US); David W Gish, Riverdale, NJ (US); Neal C Oliver, Florham Park, NJ (US)

(73) Assignee: Intel Corporation, Santa Clara, CA (US)

(*) Notice: Subject to any disclaimer, the term of this patent is extended or adjusted under 35 U.S.C. 154(b) by 1144 days.

(21) Appl. No.: 10/313,783

(22) Filed: Dec. 5, 2002

(65) Prior Publication Data

US 2004/0109473 A1 Jun. 10, 2004

(51) Int. Cl.
*H04L 12/28* (2006.01)
*H04J 3/16* (2006.01)

(52) U.S. Cl. .................... 370/392; 370/466
(58) Field of Classification Search ............... 370/338, 370/401, 389, 392, 395.6, 466
See application file for complete search history.

(56) References Cited

U.S. PATENT DOCUMENTS

| | | | |
|---|---|---|---|
| 5,832,236 A | 11/1998 | Lee | |
| 5,894,478 A * | 4/1999 | Barzegar et al. | 370/401 |
| 6,108,350 A * | 8/2000 | Araujo et al. | 370/467 |
| 6,233,389 B1 | 5/2001 | Barton et al. | |
| 6,298,446 B1 | 10/2001 | Schreiber et al. | |
| 6,327,652 B1 | 12/2001 | England et al. | |
| 6,330,670 B1 | 12/2001 | England et al. | |
| 6,353,173 B1 | 3/2002 | D'Amato et al. | |
| 6,353,892 B2 | 3/2002 | Schreiber et al. | |
| 6,372,974 B1 | 4/2002 | Gross et al. | |
| 6,407,680 B1 | 6/2002 | Lai et al. | |
| 6,446,073 B1 | 9/2002 | D'Amato et al. | |
| 6,449,367 B2 | 9/2002 | Van Wie et al. | |
| 6,463,056 B1 | 10/2002 | Silva et al. | |
| 6,690,304 B1 | 2/2004 | Shirokura et al. | |
| 7,145,914 B2 * | 12/2006 | Olarig et al. | 370/413 |
| 7,149,206 B2 * | 12/2006 | Pruzan et al. | 370/349 |
| 2001/0053156 A1 * | 12/2001 | Higuchi et al. | 370/466 |
| 2003/0099254 A1 * | 5/2003 | Richter | 370/466 |
| 2003/0126297 A1 * | 7/2003 | Olarig et al. | 709/250 |
| 2004/0010612 A1 * | 1/2004 | Pandya | 709/230 |
| 2007/0086482 A1 * | 4/2007 | Pruzan et al. | 370/466 |

FOREIGN PATENT DOCUMENTS

CN 1355982 A 6/2002
WO WO-9907116 A1 2/1999

(Continued)

OTHER PUBLICATIONS

"Actel launches initiative to solve critical communications interface challenges", May 2001.*
Alan Lewis, MPEG-4 over Wireless Networks, 2000, www.arm.com/support/54EK6Q/$File/Video_WP.pdf, Cambridge, UK.

(Continued)

*Primary Examiner*—Hong Cho
(74) *Attorney, Agent, or Firm*—Kacvinsky LLC (57) ABSTRACT

A method and apparatus to perform protocol translation for a modular system may be described wherein a first packet created in accordance with a first protocol is received, a packet type for the first packet is determined, a second protocol based on the packet type is selected and the first packet is translated to a second packet in accordance with the second protocol. Other embodiments are described and claimed.

3 Claims, 3 Drawing Sheets

FOREIGN PATENT DOCUMENTS

WO          WO 02/28123 A2      4/2002

OTHER PUBLICATIONS

Anon., Digital 5 News, Zorand and Digital 5 Partner to Demonstrate Vaddis DVD Multimedia Processor and Netmedia in Wireless Home-Networked DVD Platform, Jan. 9, 2002, www.digital5.com/press_010902a.html, USA.

Tom Hite; Jean Moonen; John Ritchie, The Audio/Video Unified Specification Approach, UPnP Newsletter, Second Quarter, 2002, www.upnp.org/newsletters/newsletterVI/tech.asp, Microsoft Corporation, USA.

Honda, Yoshiyuka, et al., "An Optimized Gateway Controller for HA System and Automatic Meter Reading System", IEEE Trans. Computer Elect., 137, (Aug. 1991),388-394.

* cited by examiner

Appendix

INTERCONNECTING NETWORK PROCESSORS WITH HETEROGENEOUS FABRICS

BACKGROUND

A modular system may comprise a number of network nodes connected by a switching fabric. The network nodes may communicate information to each other via the switching fabric using one or more communication protocols. The switching fabric and network nodes, however, may not be configured to use the same communication protocols. Consequently, certain nodes may only work with certain switching fabrics. Accordingly, there may be need for improvements in techniques to communicate information in heterogeneous environments.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to perform protocol translation. For example, in one embodiment of the invention at least one first packet created in accordance with a first protocol may be received. A packet type for the first packet may be determined. A second protocol may be selected based on the packet type. The first packet may be translated to at least one second packet in accordance with the second protocol.

More particularly, one embodiment of the invention may translate packets communicated between various elements in a modular system. For example, a network node may comprise in part a network processor and a fabric interface chip (FIC). The FIC may be configured to translate packets of varying protocols between the switching fabric and network processor. As a result, varying network processors may communicate with varying switching fabrics leading to a more robust and flexible modular system design.

In another example, the FIC may also perform protocol translation for packet communicated between the network processor and other ports of the network node, such as an adjunct or ingress port. An adjunct port may refer to a port through which a packet is transferred to an adjunct processor. An ingress (respectively egress) port may be a port through which packets enter (respectively exit) a system.

One embodiment of the invention may also perform protocol translation to optimize communications between the various elements. For example, each packet may be of a particular type, referred to herein as a packet type. The packet type may be assigned, or alternatively, may be determined from a set of criteria, such as the packet format, port assignments, predetermined flags, protocol fields and so forth. Each packet type may have an associated protocol that is particularly suitable for communication with the switching fabric or network processor. Whenever the FIC receives a packet, it may determine a packet type and select the appropriate protocol to use for protocol translation. The FIC may then translate the packet to the selected protocol. This selective mapping procedure may result in more efficient packet processing and communication, and further, may allow the FIC to perform translation services for any number of system elements.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
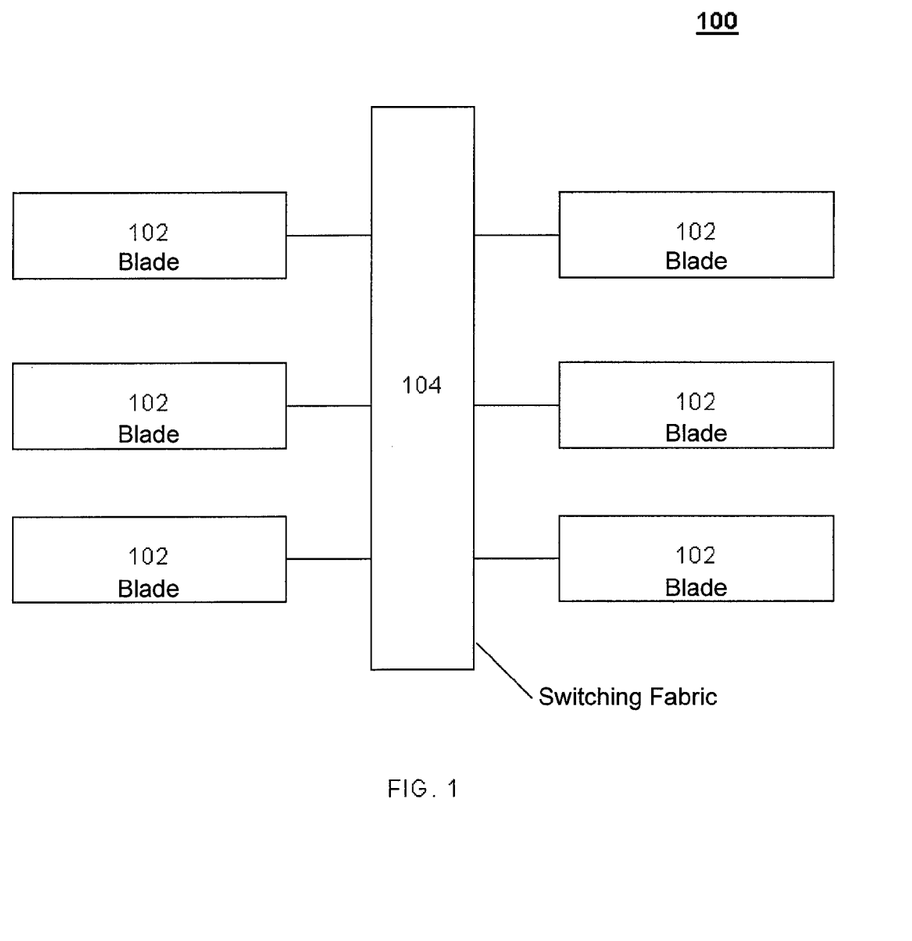
FIG. 1 illustrates a modular system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 illustrates a modular system according to one embodiment of the invention. FIG. 1 may illustrate a modular system 100 comprising one or more network nodes or "blades" 102 connected via a switching fabric 104. The term "blade" as used herein may refer to a device implemented as a single board, such as a single board computer (SBC) with a processor or controller, a router, a switch, a storage system, a network appliance, a private branch exchange (PBX), an application server, a computer/telephony (CT) appliance, and so forth. Each blade may include an interface to connect with the switching fabric, and may communicate with other blades via switching fabric 104.

Switching fabric 104 may be, for example, a layer 2 switching fabric comprising a communications circuit board having a plurality of blade interfaces. Each blade interface may provide a common interconnect for modules connected thereto. In one embodiment of the invention, the blade interfaces are in electrical communication with each other and with, for example, a system management bus of switching fabric 104. For example, switching fabric 104 may be based on a form factor as set forth by the Peripheral Component Interconnect (PCI) Industrial Computer Manufacturers Group (PICMG), such as the CompactPCI specification version 2.6 ("CompactPCI Specification"), wherein the blade interfaces are CompactPCI slots or connectors, or the AdvancedTCA (ATCA) PICMG 3.0 Draft Specification version 9.0, dated Nov. 11, 2002, although the embodiments are not limited in this context.

Each blade connected to switching fabric 104 may communicate with other blades and system resources via switching fabric 104. Each blade may have one or more layer 2 network addresses, and therefore each blade may communicate information to any other blade in the system. Switching fabric 104 and blades 102 may each communicate information in accordance with any number of communication protocols, such as layer 2 communication protocols. For example, modular system 100 may communicate information using a protocol defined by the Common Switch Interface Specification (CSIX) Forum titled "CSIX-L1: Common Switch Interface Specification-L1," version 1.0, dated Aug. 5, 2000 ("CSIX Specification"), the Infiniband Trade Association document titled "Infiniband Architecture Specification Volume 1," release 0.8, dated December 1999 ("Infiniband Specification"), the Optical Internetworking Forum (OIF) document titled "System Packet Interface Level 3 (SPI-3): OC-48 System Interface for Physical and Link Layer Devices," dated June 2000 ("SPI-3 Specification"), the OIF document titled "System Packet Interface 4 (SPI-4) Phase 2: OC-192 System Interface for Physical and Link Layer Devices," OIF-SPI4-02.0, dated January 2001 ("SPI-4 Specification"), the PCI Express Base and Advanced Switching (ExB/AS) Specification, Review Draft Revision 0.5 ("ExB/AS Specification"), and the Rapid Input/Output Trade Association document titled "RapidIP Interconnect Specification Part VI: Physical Layer 1x/4x LP-Serial Specification," revision 1.1, dated December 2001 ("S-RIO Specification"), although the embodiments are not limited in this context.

Figure 2:
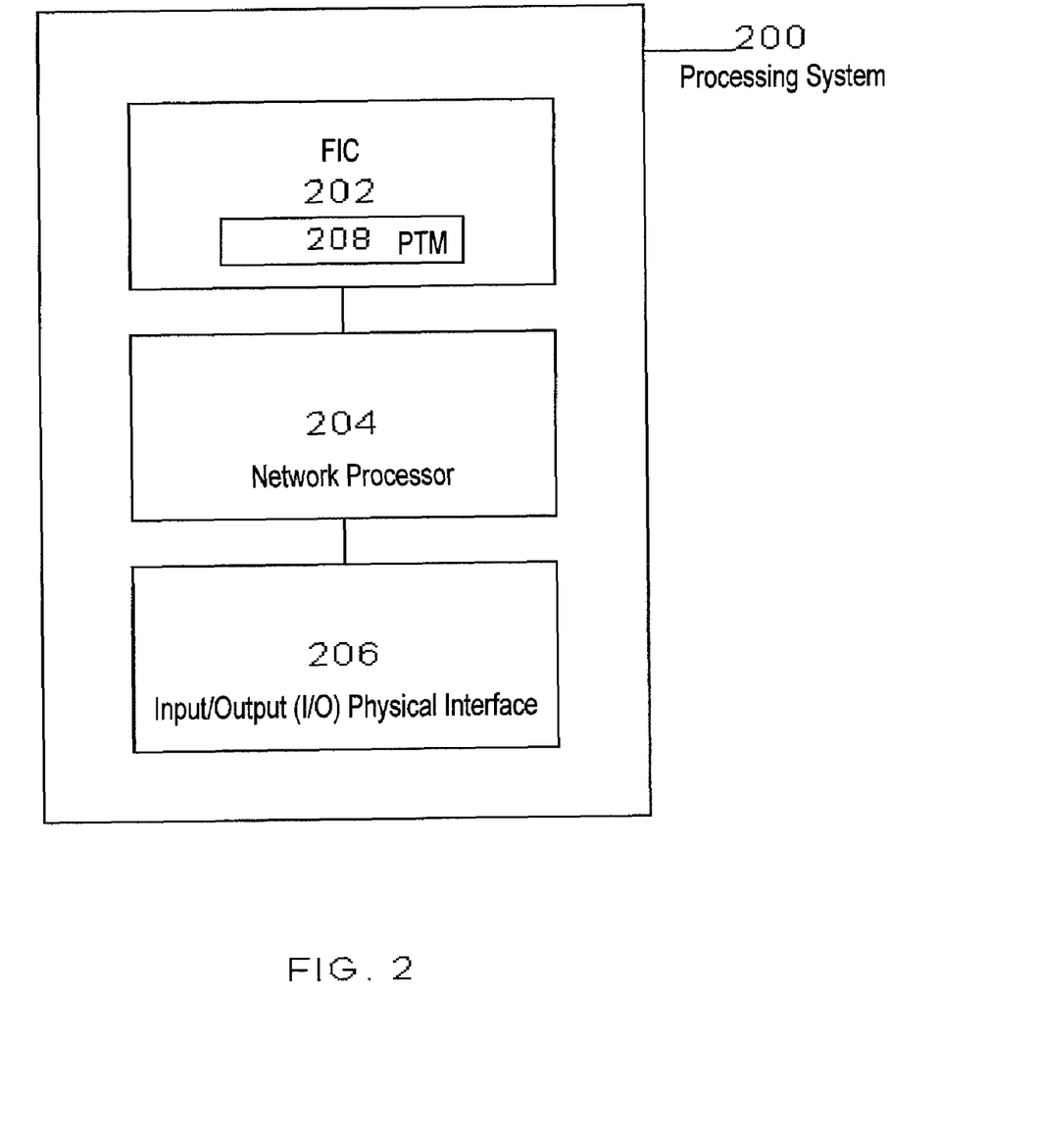
FIG. 2 illustrates a block diagram of a processing system in accordance with one embodiment of the invention.

FIG. 2 illustrates a block diagram of a processing system in accordance with one embodiment of the invention. FIG. 2 may illustrate a processing system 200 that incorporates functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment of the invention, processing system 200 may comprise a blade designed to work as a modular component of modular system 100. Blade 200 may represent, for example, any of blades 102. In one embodiment of the invention, blade 200 may include interconnects designed in accordance with the ATCA Specification or CompactPCI Specification. It may be appreciated, however, that any suitable interface standard may be utilized and still fall within the scope of the invention.

In one embodiment of the invention, blade 200 may comprise a FIC 202, a network processor 204 and an input/output (I/O) physical interface 206. FIC 202 may further comprise, for example, a Protocol Translation Module (PTM) 208. An example of network processor 204 include a network processor made by Intel™ Corporation, such as the IXP 2800™. I/O physical interface 206 may be any physical interface for communicating information, such as the Ethernet Express Pro 100 compatible, Intel 82559 Fast Ethernet Multifunction PCI Controller, made by Intel Corporation ("82559 Controller"). The 82559 Controller may include both a Media Access Controller (MAC) and a physical layer (PHY) interface combined into a single component solution. I/O physical interface 206 may also include physical connectors, such as RJ-45 connectors on the faceplate of blade 200. The faceplate may also include status light emitting diodes (LED) to indicate the status of each channel. Blade 200 may also comprise various other elements as desired for a particular implementation, such as a power supply for the processor's unique voltage requirements, a temperature sensor, system memory (e.g., L2 cache), core logic required to bridge the processor to the standard system buses, system controllers and so forth.

In one embodiment of the invention, FIC 202 may translate protocols from switching fabric 104 to network processor 204. For example, switching fabric 104 may communicate packets in accordance with the Infiniband Specification, while network processor 204 may prefer to operate on packets communicated in accordance with the CSIX Specification or SPI-4 Specification. In this case, FIC 202 may translate an Infiniband (IBA) packet to a CSIX packet or SPI-4 packet on behalf of network processor 204. Conversely, FIC 202 may translate a CSIX packet or SPI-4 packet to an IBA packet on behalf of switching fabric 104. The term "translating" or "mapping" as used herein may refer to taking information carried by a packet or a series of packets and placing the information into another packet or a series of packets. It can be appreciated that these protocols are provided only as examples. The embodiments of the invention are not limited in this context, as illustrated in more detail below.

The operations of systems 100 and 200 may be further described with reference to FIG. 3 and accompanying examples. Although FIG. 3 as presented herein may include a particular programming logic, it can be appreciated that the programming logic merely provides an example of how the general functionality described herein can be implemented. Further, each operation within a given programming logic does not necessarily have to be executed in the order presented unless otherwise indicated.

Figure 3:
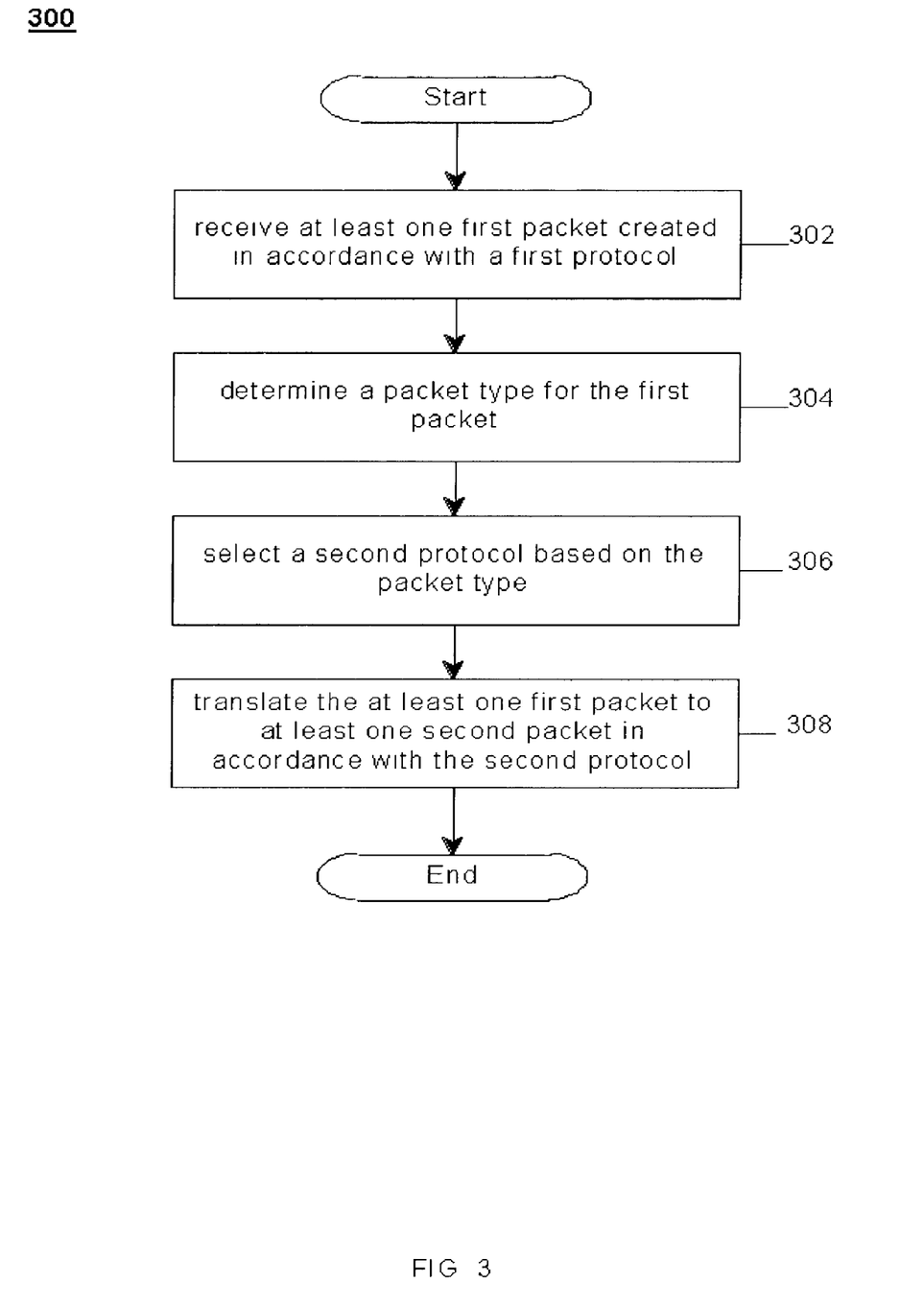
FIG. 3 is a block flow diagram of the programming logic performed by a Protocol Translation Module (PTM) in accordance with one embodiment of the invention.

FIG. 3 illustrates a block flow diagram of the programming logic for a Protocol Translation Module (PTM) in accordance with one embodiment of the invention. In one embodiment of the invention, this and other modules may refer to the software and/or hardware used to implement the functionality for one or more embodiments as described herein. In one embodiment of the invention, the PTM may be implemented as part of a processing system, such as FIC 202 of processing system 200. It can be appreciated that this functionality, however, may be implemented by any device, or combination of devices, located anywhere in a communication path and still fall within the scope of the invention.

FIG. 3 illustrates a programming logic 300 for a PTM in accordance with one embodiment of the invention. More particularly, programming logic 300 illustrates operations to translate a protocol or set of protocols. For example, at least one first packet created in accordance with a first protocol may be received at block 302. A packet type for the first packet may be determined at block 304. A second protocol may be selected based on the packet type at block 306. The at least one first packet may be translated to at least one second packet in accordance with the second protocol.

In one embodiment of the invention, each packet may have an associated packet type. The packet type may represent the type or class of a particular packet. For example, the Infiniband Specification defines a packet type referred to as a Backward Event Congestion Notification (BECN) packet. For some implementations, it may be desirable for PTM 208 to translate a particular packet type to a particular protocol. Consequently, each packet type may have a protocol associated with it, with the associated protocol indicating the protocol to which a received packet should be converted. For example, the first protocol may be the IBA protocol, and the packet type may be a BECN packet. The BECN packet type may have a protocol associated with it, such as the CSIX protocol. The CSIX protocol may be, for example, the second protocol. Accordingly, whenever PTM 208 receives a BECN packet, it will know to translate the BECN packet to a CSIX packet.

Once the packet type is known, PTM 208 may translate the first packet from a BECN packet to a CSIX packet. This may be accomplished, for example, by retrieving a Local Route Header (LRH) having BECN information in a BECN message field from the first packet. Network address and congestion control information may be retrieved from the BECN information, with the congestion control information having a first portion and a second portion. The term "network address" as used herein may refer to any layer 2 address information, such as a destination address, a source address, a port identifier, a MAC address and so forth. The network address may be mapped to a CSIX destination address field of the second packet. The first portion may be mapped to a CSIX speed field of the second packet. The second portion may be mapped to a CSIX class field of the second packet.

In one embodiment of the packet, the packet type may comprise an IBA data packet. The second protocol associated with the IBA data packet may comprise a protocol in accordance with the SPI-4 Specification. The first packet may comprise header information and payload information. In this case, PTM 208 may translate the IBA data packet to one or more SPI-4 packets. This may be accomplished by, for example, mapping the header information and a portion of the payload information into at least one SPI-4 packet. Any remaining payload information may be mapped into additional SPI-4 packets until the payload information has been completely mapped. Each SPI-4 packet may include a SPI-4 header in accordance with the SPI-4 Specification.

In one embodiment of the invention, the packet type may comprise a Multi-Protocol Label Format (MPLF) packet. The MPLF packet may be, for example, MPLF information encapsulated in a raw IBA data packet. The second protocol associated with the MPLF packet may comprise a protocol as described by the CSIX Specification. The first packet may comprise LRH information, MPLF header information, and payload information. In this case, PTM 208 may translate the MPLF packet to one or more CSIX packets. This may be accomplished by, for example, mapping the MPLF header information and a portion of the payload information into a CSIX packet. Any remaining payload information may be mapped into additional CSIX packets until the payload information has been completely mapped. A CSIX header may be added to each CSIX packet in accordance with the CSIX Specification. At least a portion of the LRH information may be mapped into each CSIX header.

In one embodiment of the invention, the LRH information may be mapped into each CSIX header by retrieving service level information, length information and a network address from the LRH information. The service level information may be mapped to a CSIX class field. The length information may be mapped to a CSIX length field. A first portion of the network address may be mapped to a CSIX destination address field. A second portion of the network address may be mapped to a CSIX reserved field.

In one embodiment of the invention, the first protocol may be a protocol as defined by the SPI-4 Specification. The packet type may be one of a BECN packet, an Infiniband data packet or a Multi-Protocol Label Format (MPLF) packet. The second protocol may comprise a protocol in accordance with the Infiniband Specification. In this case, PTM 208 may translate one or more SPI-4 packets to the appropriate packet type. For example, if the packet type was a BECN packet, then the SPI-4 packets may be translated to one or more BECN packets. This may be accomplished by, for example, retrieving header information and a portion of payload information from the first packet. Any remaining payload information from additional SPI-4 packets in the sequence may also be retrieved. At least one second packet may be created using the retrieved header information and payload information.

It can be appreciated that the embodiments of the invention may apply to any number of protocols and packet types and still fall within the scope of the invention. For example, the first protocol may comprise a protocol as defined by the ExB/AS Specification. In this case, the second protocol may be a protocol such as the CSIX protocol and/or SPI-4 protocol.

The operation of systems 100 and 200, and the programming logic shown in FIG. 3 may be better understood by way of example. Assume network processor 204 comprises a network processor optimized to process CSIX packets. This may be desirable since the CSIX Specification is a fabric-neutral standard supported by many access and ingress interfaces. Further assume that switching fabric 104 is an IBA switching fabric incorporating, for example, inter-node flow control and intra-node congestion control techniques. System traffic at this point may comprise "normal" IBA data packets, IBA congestion control packets (e.g., BECN packets), and MPLF packets encapsulated into raw IBA data packets. A "normal" IBA data packet may refer to a local or global IBA data packet. In addition, assume blade 200 processes SPI-3 packets communicated on an adjunct port, and S-RIO and ExB/AS packets communicated on an ingress port. Given this system configuration, FIC 202 of blade 200 may need to translate packets of varying protocols between various elements connected to blade 200.

As illustrated above, network processor 204 and switching fabric 104 may communicate with each other using varying protocols. It may be desirable, therefore, to select a protocol translation algorithm that optimizes system performance under a number of different design constraints for each system element. For example, assume network processor 204 has the following processing requirements:

In order to use special purpose hardware, network processor 204 should be configured to work with a specific data unit size, chosen from 64, 128, or 256 bytes. All mini-packets arriving in network processor 204 should contain this number of bytes unless the mini-packet represents the last segment of a packet.

The hardware supports automatic processing of CSIX packets. Thus, incoming data should be formatted in accordance with the CSIX Specification unless some other overriding requirement is in conflict.

The number of distinct packet types received by network processor 204 should be as few as possible under the circumstances.

In addition, some of the design constraints for modular system 100 may be to operate with a number of different standards. For example, assume modular system 100 desires to conform to the following requirements:

Special processing and proprietary components should not be required to transport packets over switch fabric 104. Consequently, switch fabric 104 should carry typical IBA packets. IBA reserved fields should not be overloaded if possible.

Data communicated by an adjunct node should be formatted in SPI-3 packets.

Data communicated by an ingress node should be formatted in S-RIO or ExB/AS packets, with the final choice being a configuration parameter.

Regardless of format, packets should be transported from a source network processor to a destination network processor with minimal information loss. Consequently, any encapsulation or mapping should address missing data types or data types with different information contents.

Flow control packets should be transported from source to destination with minimal information loss and minimal head-of-line (HOL) blocking from data packets.

CSIX reserved fields should not be overloaded, if possible.

In addition to any standards based requirements, modular system 100 may also have protocol flow requirements. For purposes of this example, assume that modular system 100 has a design constraint that all flows into any virtual lane of modular system 100 shall be contiguous. This may mean, for example, that even if a packet formed at a higher protocol layer than the transport layer is longer than the mini-packet length configured into the system, the packet should be segmented and transported in contiguous mini-packet segments through modular system 100. Further, the mini-packets should be received in the same order as sent, with no extraneous mini-packets interpolated into the mini-packet stream.

Further, modular system 100 may also have MPLF related requirements. MPLF is a packet format designed to support uniform access to varying switch fabrics. MPLF may be thought of as a "shim" layer on top of IBA and various other switch fabric packet formats. Consequently, an MPLF header may be treated as a payload by switch fabric 104 and FIC 202, since it is network processor 204 that interprets the MPLF header.

Once the various design constraints have been identified, a packet format comparison may be performed to identify and address any mapping issues. For example, a comparison of packet formats as described by the IBA Specification, CSIX Specification and SPI-4 Specification, may be summarized in Table 1 below. For purposes of this example, the IBA header may refer to the LRH, which is an 8-byte field whose contents are shown in column 1 of the table. The CSIX header may be a concatenation of the CSIX Base Header and either the CSIX Base Extension Header or the CSIX Flow Control Header, as shown in columns 2, 2a, and 2b, respectively. The SPI-4 header, also referred to as the "Packet Control Word," may be a 16-bit element describing the meaning of the following payload and indicating how many padding bytes appear at the end of the payload.

TABLE 1

| Infiniband (IBA) LRH | CSIX Base Header | SPI-4 Payload Control |
|---|---|---|
| VL: 4 bits. Specifies a virtual lane to be used for a packet. This field identifies which receive buffer and which receive flow control credits should be used for the received packet. This value is set to the VL on which the packet is sent. It may change from link to link in a subnet. This field is not included in the Invariant CRC field. | Ready Field: 2 bits. Indicates when the transmitting entity is also ready to receive data. Ready[0] is used for control traffic, Ready[1] is used for data traffic. | Control Word Type: 1 bit. Indicates whether the data immediately following the control word is payload or a training-control word. End of Packet (EOP) Status: 2 bits. Indicates whether the following payload represents the end of a packet, and how many of the final bytes in the payload (1 or 2) are valid data. NB: Packet length is not encoded, as the standard does not specify a packet length. Start of Packet (SOP): 1 bit. Indicates that the following payload is the start of a packet. |
| | Type Field (4 bits). Indicates the type of Cframe (e.g. unicast, multicast bitmask, flow control), and the format of the extension header that immediately follows the CSIX base header. | Port Address: 8 bits. 8-bit port address of the payload directly following the control word. |
| LVer: 4 bits. Link Version specifies the version of the Local Routing Header used for this packet. It shall be set to 0. If a receiving device does not support the Link Version specified then the packet is discarded. | CSIX Reserved (1 bit) | |
| SL: 4 bits. Used by switches to determine the VL used for this packet. The SL of a packet shall not be changed as a packet crosses the subnet. It is intended to indicate the service class of a packet. It will be used in SL-to-VL mapping, and data VL arbitration. Rsv2: 2 bits. Transmitted as 0x00 and not changed | Reserved (1 bit) Payload Length (8 bits): number of bytes in the payload of the message, not counting the padding between the end of the data and the vertical parity field. For data Cframes, 0 means that the payload is 256 bytes. | Diagonal Interleaved Parity (DIP): 4 bits |

TABLE 1-continued

| | (CSIX unicast extension header) | (CSIX flow control header) |
|---|---|---|
| Link Next Header (LNH): 2 bits. Specifies what headers follow the LRH. The first bit indicates whether IBA transport is used. The second bit indicates whether GRH/IPv6 header is present. | | |
| Destination Local Identifier: 16 bits. Specifies the LID of the port to which the subnet delivers the packet. LIDs are unique within a subnet. | Class (8 bits). Represents up to 256 isolated classes for every destination address. Private (2 bits). CSIX Reserved (6 bits) | FC Entry Type (2 bits) Class wildcard (1 bit). If set to 1, then flow control is intended to apply to all classes associated with the destination address. Port wildcard (1 bit). If set to 1, then flow control is intended to apply to all destination ports. Speed (4 bits). Private (2 bits) CSIX private (2 bits) |
| Reserve5: 5 bits. transmitted as 00000 and ignored on receive. Packet Length: 11 bits. The number of 4-byte words contained in the packet, starting with the first byte of the LRH and the last byte before the Variant CRC, inclusive, divided by 4. Max allowable size of all headers plus the CRC fields is 126 bytes. Max value of this field is (4096 + 126 − 2)/4 = 4220/4 = 1055. Source Local Identifier: 16 bits. For all non-directed route packets, the SLID shall be a LID of the port that injected the packet onto the subnet. | CSIX Reserved (4 bits) Destination address (12 bits). Represents a destination traffic manager (TM) (e.g., network processor) port. | |

Table 1 may help to illustrate the differences in arrangement of data elements and also in the content of the data elements. With respect to the content differences, Table 1 highlights the following differences:

- IBA contains Service Level (IBA-SL) and Virtual Lane (IBA-VL) fields. IBA-SL is treated as an end-to-end service level designation, and conceptually is used to derive an IBA-VL at each hop of an IBA packet through a network. CSIX contains a CSIX-Class field, whose purpose is similar to the IBA-SL. CSIX-Class is 8 bits in length, however, and IBA-SL is only 4 bits in length.
- IBA encodes an IBA Source Local Identifier (IBA-SLID) field and an IBA Destination Local Identifier (IBA-DLID) field, both treated as endpoint port addresses within the subnet. CSIX encodes only a CSIX-Destination field that represents a destination traffic manager (e.g., network processor 204). IBA-DLID and CSIX-Destination correspond to each other semantically, but IBA-DLID is 16 bits in length and CSIX-Destination is only 12 bits in length. CSIX has no standard way to encode a source address.
- IBA encodes an IBA-Packet Length field that represents the number of 32-bit words in the header and payload, exclusive of the CRC field. CSIX encodes a CSIX-Payload Length field that represents the number of bytes in the payload, not including the header. IBA Packet Length field is 11 bits, and CSIX-Payload Length field is 8 bits, which may represent a significant difference.
- In contrast to the IBA and CSIX standards, SPI-4 does not encode packet lengths in its Packet Control word. A Control Word is indicated by assertion of the RCTL signal on the interface, and all other data is considered to be payload. There are constraints on the payload, such as a large payload must be transmitted in a burst that is a multiple of 16, and the time interval between subsequent start-of-packet control words must be at least 8 word-cycles apart.
- CSIX contains two CSIX-Ready bits, one for data messages and one for control messages, intended to signal that the transmitting entity is also ready to receive messages. These bits are part of the CSIX link-level flow control mechanism, and are the closest analog to the IBA credit mechanism. It is worthy to note, however, that because CSIX does not encode the source port address, these bits are meaningful only at the switch fabric port to which the CSIX port is connected. The reason is because only at that port is the transmitting port uniquely identified by context.
- CSIX contains a CSIX-Type field that indicates the type of the CSIX packet and as a consequence also the extension header that follows the base header. The comparison to be made here between CSIX and IBA is not whether a similar field exists, but rather whether all of the packet types denoted by CSIX-Type also exist in IBA.

IBA includes an IBA Link Next Header (IBA-LNH) field, which indicates what "extension header" follows the LRH. Either or both of the IBA Transport Header and the GRH/IPv6 headers may be present. None of the information in these "extension headers" is needed by CSIX, but the information and the IBA-LNH bits must be correct when the IBA packet enters the subnet.

An additional difference of note that does not readily appear in the packet formats is that CSIX may accommodate extension "shims" without much difficulty. This may be because CSIX is essentially an interface between a traffic manager and a switch fabric. IBA may not have that ability, since it is a protocol used by switches and endpoints. Thus, CSIX could be extended in those cases where corresponding IBA fields have more bits of information content. For corresponding fields where CSIX has more information content, the additional information may be encoded in the packet payload. This may require Cyclic Redundancy Check (CRC) calculations, however, upon conversion between CSIX and IBA packet formats.

Table 1 may also illustrate that certain CSIX fields do not have a corresponding equivalent IBA field. For example, the CSIX-Class field, which corresponds to the IBA-SL field in IBA, has more bits. If it were not possible to map the CSIX-Class field to the IBA-SL field and vice-versa, assigning a correct service/class level to a packet upon arrival at its destination may require provisioning a service level mapping table at every point in the network. This may be a particularly complex solution. One alternative may be to restrict the number of different CSIX-Class levels to be supported in modular system 100. This is allowed by the CSIX standard, since no more bits of CSIX-Class need be carried than are available in the switch fabric with which it interoperates.

Based on the above comparisons, it may be appreciated that some protocols are better suited to translation into other protocols. For example, based on a comparison of CSIX and IBA fields, it may be concluded that the CSIX packet format is not suitable for IBA data packets. Table 1 illustrates that there are certain IBA fields that do not have a corresponding equivalent CSIX field. For example, IBA encodes both source and destination ports and uses 16 bits of resolution, whereas CSIX encodes only the destination port and only 12 bits of resolution. To reduce information loss and ensure standards conformance, the CSIX-Reserved field of the CSIX extension header may be used to extend the CSIX-Destination Address field. Further, the CSIX-Destination Address field is undefined by the standard when received at a destination, and therefore may be used for the source address by FIC 202. In those cases where both a source and destination address is desired (e.g., with data packets), however, the CSIX packet format may not be suitable. Another limitation of the CSIX packet format is that payload sizes are restricted to 64 bytes. This is more restrictive than IBA, thus potentially leading to decreased performance. It may also be more restrictive than the packet length constraints of network processor 204.

Given the above design constraints, performance of modular system 100 may be improved by identifying those protocols suited to each other. For modular network 100, packets coming from switch fabric 104 to network processor 204 may be in the form of IBA packets. Those IBA packets having a packet type of BECN packet or MPLF packet, may be converted to a CSIX packet format. Those IBA packets having a packet type of IBA data packet may be converted to SPI-4 packets. In addition, network processor 204 may receive packets from an adjunct port of blade 200 in the form of SPI-3 packets, and packets from an ingress port of blade 200 in the form of S-RIO and ExB/AS packets. These packet types may be converted to SPI-4 packets as well, and delivered to network processor 204. Conversely, those packets originating from network processor 204 may be created as SPI-4 packets, and converted by FIC 202 into the appropriate packet type, e.g., BECN packet, MPLF packet or IBA data packet. The converted packets may then be sent to the appropriate destination via switching fabric 104.

Continuing with the example, assume a case where FIC 202 receives a BECN packet. A BECN packet may comprise a standard IBA packet with a LHR containing the BECN message information. Typically, BECN packets are carried in a high-priority virtual lane in modular system 100. PTM 208 of FIC 202 may determine that the received packet type is a BECN packet, and that it should be translated into a CSIX flow control message. In this mapping, the source address contained in the BECN Message part of the IBA header overloads the CSIX-Destination Address and CSIX-Reserved fields. The remainder of the BECN Message providing specific congestion control information may be transparently mapped to the CSIX-Class and CSIX-Speed fields, for later interpretation by network processor 204. It is worthy to note that since the size of a BECN message is relatively short, the mapping of the BECN message may be accomplished using a single CSIX flow control message.

Further with our example, assume that FIC 202 receives an IBA data packet. As previously discussed, IBA data packets do not map well to CSIX packets. This also applies to S-RIO, ExB/AS and SPI-3 packets as well. PTM 208 may determine that the received packet type is an IBA data packet, and that it should be translated to a sequence of SPI-4 packets, where the individual SPI-4 packets are constructed to satisfy the packet size constraints configured into network processor 204. As previously mentioned, modular system 100 assumes that packets formed at a higher protocol layer are transported in contiguous segments through the system. Thus, if a data packet arrives at FIC 202 with a length greater than the packet length configured in network processor 204, FIC 202 may segment the arriving packet into a contiguous sequence of mini-packets encoded as SPI-4 packets. The IBA/S-RIO/ExB/AS header of the inbound packet is preserved intact as part of the payload of the first SPI-4 packet of a sequence. The remainder of the first SPI-4 packet may be padded with contiguous data from the inbound data packet. The remainder of the inbound data payload is segmented into SPI-4 payloads, such that each of the resulting SPI-4 packets except possibly the last is of the configured length of network processor 204.

Further to our example, assume that FIC 202 receives an MPLF packet. IBA encapsulates MPLF messages using an IBA Raw Mode packet format. They may, in general, be of any length supported by switch fabric 104, and may therefore be longer than packet length configured in network processor 204. The MPLF messages may therefore be segmented into mini-packets similar to IBA data packets. Because MPLF exists as a shim layer above switch fabric 104, the routing fields are considered payload information with respect to IBA, and are interpreted by network processor 204 and not FIC 202. Examples of the routing fields may include the source and destination addresses. Therefore, in contrast to the case of the IBA data packets, MPLF packets may be segmented into CSIX packets. The IBA LRH is mapped into the CSIX header as in the case of IBA BECN messages. The MPLF header may be loaded into the first CSIX packet of the sequence, and the remainder of the payload is segmented into uniform-sized CSIX packets, except for perhaps the last packet in the sequence.

Continuing with the example, assume that FIC 202 receives a SPI-3 packet from the adjunct node, or a S-RIO or ExB/AS from the ingress node. Because it can be inferred that these packets have a header and a payload size possibly larger than the packet size configured in network processor 204, they may be treated in the same manner as IBA data packets, i.e., segmented into a sequence of SPI-4 packets.

Further to the example, assume that FIC 202 receives packets from network processor 204 for transport by switching fabric 104. When network processor 204 creates a mini-packet and sends it to some possible destination, the mini-packet may by definition pass through FIC 202. Network processor 204 may know a priori whether the destination is an adjunct port, an ingress port, or a switch fabric port, and therefore the type of packet that is appropriate to create for the destination. On the other hand, network processor 204 may still be constrained by its packet-handling hardware to deal with a fixed packet size. The mapping of packets outbound from network processor 204 therefore may take place in two operations.

Network processor 204 may perform the first operation by creating a SPI-4 mini-packet sequence, where the sequence encapsulates an outbound message. The first mini-packet in the message may contain a header, directly after the SPI-4 header, and the remaining mini-packets in the sequence may contain contiguous lengths of the payload.

FIC 202 may perform the second operation by identifying the packet header provided in the first mini-packet of the sequence, and mapping it into an appropriate packet type header, e.g., SPI-3, S-RIO/ExB/AS. FIC 202 may perform this translation by reversing the relevant mapping procedures described above. FIC 202 may then construct the payload by reassembling its fragments from the remaining mini-packets of the mini-packet sequence into a contiguous packet, and then routing it to the appropriate destination port.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to translate a protocol, comprising:
   receiving at least one first packet created in accordance with a first protocol as defined by an Infiniband Specification;
   determining a packet type for said first packet, said packet type comprising a Backward Event Congestion Notification (BECN) packet;
   selecting a second protocol as defined by a Common Switch Interface (CSIX) Specification based on said packet type; and
   translating said at least one first packet to at least one second packet in accordance with said second protocol, said translating comprising:
      retrieving a Local Route Header (LRH) having BECN information in a BECN message field from said first packet;
      retrieving a network address and congestion control information from said BECN information, said congestion control information having a first portion and a second portion;
      mapping said network address to a CSIX destination address field of said second packet;
      mapping said first portion to a CSIX speed field of said second packet; and
      mapping said second portion to a CSIX class field of said second packet.

2. An article comprising:
   a storage medium;
   said storage medium encoded with instructions that, when executed by a processor, result in translating a protocol by receiving at least one first packet created in accordance with a first protocol as defined by an Infiniband Specification, determining a packet type for said first packet, said packet type comprising a Backward Event Congestion Notification (BECN) packet, selecting a second protocol as defined by a Common Switch Interface (CSIX) Specification based on said packet type, and translating said at least one first packet to at least one second packet in accordance with said second protocol, said translating comprising retrieving a Local Route Header (LRH) having BECN information in a BECN message field from said first packet, retrieving a network address and congestion control information from said BECN information, said congestion control information having a first portion and a second portion, mapping said network address to a CSIX destination address field of said second packet, mapping said first portion to a CSIX speed field of said second packet, and mapping said second portion to a CSIX class field of said second packet.

3. A system, comprising:
   a switching fabric;
   at least one network node connected to said switching fabric, said network node comprising a network processor and, a Fabric Interface Chip (FIC), wherein said FIC translates one or more packets communicated between said switching fabric and said network processor from a first protocol to a second protocol based on a packet type associated with each packet, said FIC operative to receive at least one first packet created in accordance with a first protocol as defined by an Infiniband Specification, determine a packet type for said first packet, said packet type comprising a Backward Event Congestion Notification (BECN) packet, select a second protocol as defined by a Common Switch Interface (CSIX) Specification based on said packet type, and translate said at least one first packet to at least one second packet in accordance with said second protocol, said FIC further operative to retrieve a Local Route Header (LRH) having BECN information in a BECN message field from said first packet, retrieve a network address and congestion control information from said BECN information, said congestion control information having a first portion and a second portion, map said network address to a CSIX destination address field of said second packet, map said first portion to a CSIX speed field of said second packet, and map said second portion to a CSIX class field of said second packet.

* * * * *

UNITED STATES PATENT AND TRADEMARK OFFICE
CERTIFICATE OF CORRECTION

PATENT NO. : 7,573,876 B2
APPLICATION NO. : 10/313783
DATED : August 11, 2009
INVENTOR(S) : Lebizay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1812 days.

Signed and Sealed this

Seventh Day of September, 2010

David J. Kappos
*Director of the United States Patent and Trademark Office*